United States Patent [19]
Kantz

[11] 3,992,704
[45] Nov. 16, 1976

[54] ARRANGEMENT FOR WRITING-IN BINARY SIGNALS INTO SELECTED STORAGE ELEMENTS OF AN MOS-STORE

[75] Inventor: Dieter Kantz, Munich, Germany

[73] Assignee: Siemens Aktiengesellschaft, Berlin & Munich, Germany

[22] Filed: Sept. 5, 1975

[21] Appl. No.: 610,756

[30] Foreign Application Priority Data
Sept. 11, 1974 Germany............................ 2443529

[52] U.S. Cl. .......................... 340/173 CA; 307/238; 340/173 FF
[51] Int. Cl.² ......................................... G11C 13/00
[58] Field of Search.... 340/173 R, 173 FF, 173 CA; 307/238

[56] References Cited
UNITED STATES PATENTS

| | | | |
|---|---|---|---|
| 3,675,218 | 7/1972 | Sechler.......................... | 340/173 FF |
| 3,838,295 | 9/1974 | Lindell.............................. | 307/238 |
| 3,838,404 | 9/1974 | Heeren............................ | 340/173 R |
| 3,863,232 | 1/1975 | Johnson et al.................. | 340/173 R |
| 3,892,984 | 7/1975 | Stein............................. | 340/173 CA |
| 3,940,747 | 2/1976 | Kuo et al....................... | 340/173 CA |

*Primary Examiner*—David L. Trafton
*Attorney, Agent, or Firm*—Hill, Gross, Simpson, Van Santen, Steadman, Chiara & Simpson

[57] ABSTRACT

An arrangement for writing binary signals into selected storage elements of an MOS store having word and bit lines, utilizing a read-out amplifier which is constructed as a pulsed flip-flop, and which comprises two inverters with feed-back, each comprising a switching transistor and a load transistor, each feedback arm having a cut-off transistor disposed therein, in which write-in information is supplied to only one of the bit lines, by use of a bit switch, a write-in pulse train and a bit decoder. Such uncoupling of the other bit line may be achieved by blocking of the appropriate cut-off transistor, or the W/L, in which W is the width and L the length of the channel, of the MOS cut-off transistors is lower than the corresponding ratio of the switching transistors, whereby the internal resistance of the cut-off transistors, even though conductive, is high in comparison to that of the switching transistors.

5 Claims, 6 Drawing Figures

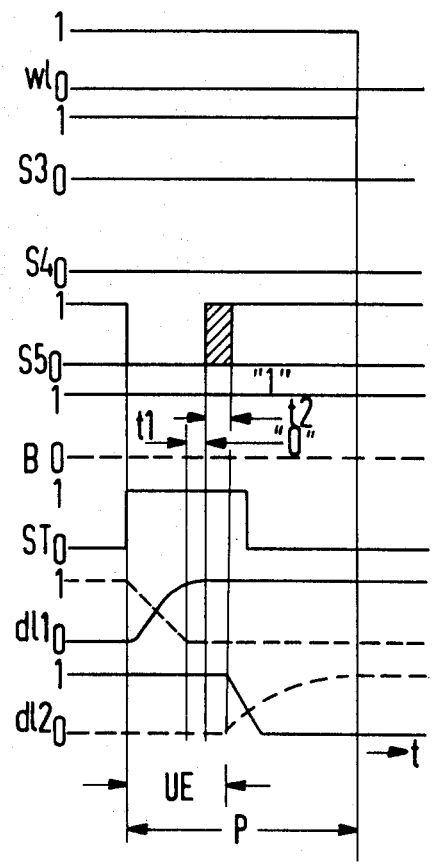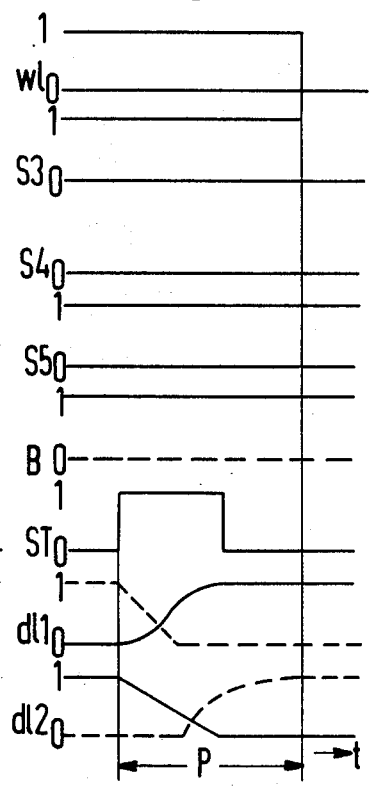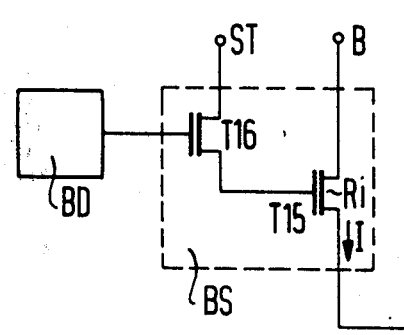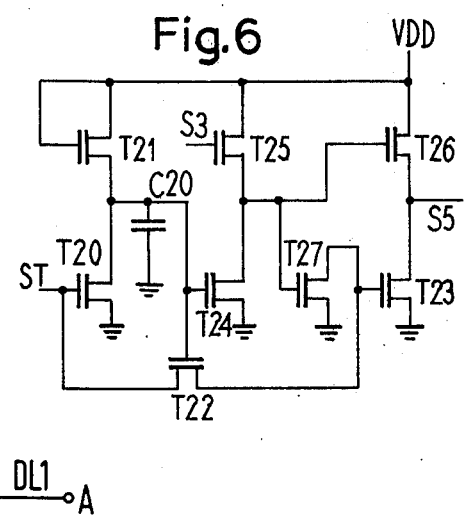

ARRANGEMENT FOR WRITING-IN BINARY SIGNALS INTO SELECTED STORAGE ELEMENTS OF AN MOS-STORE

BACKGROUND OF THE INVENTION

The invention relates to an arrangement for the writing in of binary signals into selected storage elements of an MOS store, utilizing a read-out amplifier which is constructed as a pulsed flip-flop and which comprises two inverters with feed-back each including a switching transistor and a load transistor with each feed-back arm having a cut-off transistor disposed therein.

MOS stores are already known, for example, see Electronics Feb., 15, 1971, pages 80 to 85. Storage elements in such an MOS store are known in the form of single-transistor storage element, for example, see Electronics Sept. 13, 1973, pages 116 to 121. In such an MOS store, the storage elements are disposed at the intersections of word lines and bit lines, and arranged between two bit lines is a read-out amplifier which is constructed as a pulsed flip-flop circuit and symmetrically connected to the bit lines, with such bit lines each being connected to a drain terminal of a corresponding switching transistor of the pulsed flip-flop.

FIG. 1 of the drawings illustrates such a read-out amplifier LVI, which comprises inverters T1, T3 and T2, T4.

The MOS transistors T1 and T2 form switching transistors while the MOS transistors T3 and T4 are load transistors. The other MOS transistor T5 is always open during the write-in operation. VDD designates an operating voltage, while S1 and S2 designate respective timing signals. Bit lines DL1 and DL2 are respectively connected to the drain terminals of the transistors T1 and T2 with storage elements SE being disposed at the intersections of the bit lines DL1 and DL2 with work lines WL. The line capacitances of the respective bit lines DL1 and DL2 are designated C1 and C2 while R represents the resistance of the bit line DL1.

The item of information to be written into one of the storage elements SE is supplied to the bit line at the point A, with the read-out amplifier LV1 being additionally employed for the write-in of the binary signals. Consequently, for this purpose, it must be operated in such manner that the bit line is recharged in accordance with the binary signal which is to be written in.

As the bit line DL1 in this arrangement is connected to the drain terminal of the switching transistor T1, the bit line is heavily loaded by such transistor and in such arrangement the write-in of the binary signal 1 into one of the storage cells SE is particularly critical. If, for example, after the read-out process the bit line DL2 carries a 1, the transistor T1 is highly conductive and thus the bit line is fully discharged. If in the write-in process the binary signal 1 is to be transmitted on the bit line DL1, there is a voltage division between the resistance R of the bit line DL1 and the internal resistance of the highly conductive switching transistor T1.

Consequently, at point A there must be supplied through the switching transistor T1 a current of sufficient magnitude to enable the voltage of the bit line DL1 to be connected to the control input of the switching transistor T2 over the latter's threshold voltage VT. As a result of such voltage division, the control voltage for the switching transistor T2 is very low so that the bit line DL2 is only slowly discharged by the switching transistor T2. Consequently, the switching transistor T1 is also blocked with delay over the flip-flop feedback. Only after the blockage of the switching transistor T1 is the bit line DL1 fully charged, and the write-in process thus terminated. This known read-out amplifier thus has the disadvantage that an excessively long write-in phase is required.

SUMMARY OF THE INVENTION

The invention has as its objective the production of an arrangement for writing binary signals into selected storage elements of an MOS transistor, in which a read-out amplifier is used which likewise comprises two inverters with feed-back, each having one switching transistor and one load transistor, and in addition, a cut-off transistor is disposed in each feed-back arm. however, the bit lines of the storage elements are in this case connected to the control input gates of the respective switching transistors of the read-out amplifier, and a bit switch, controlled by a write-in pulse train and a bit decoder, supplies the write-in information to only one of the bit lines.

A read-out amplifier of the type described is illustrated in the German patent application P 23 61 823.7, which, however, involves only the arrangement for read-out operations. If a read-out amplifier of this type is additionally utilized for the writing-in of binary signals, the bit line can be connected to the control inputs of the switching transistors. The loading of the bit line by the switching transistors during the write-in operation thus can be considerably reduced. The cut-off transistors disposed in the feedback arms of the read-out amplifier, constructed as a flip-flop circuit, can be open during the write-in process, which prevents the voltage conditions on the second bit line from affecting the voltage conditions on the first bit line.

Further the cut-off transistors can be so dimensioned that, even if conductive during the write-in operation, they possess a very high internal resistance and thus the first bit line still is effectively decoupled from the switching transistor of the second inverter.

BRIEF DESCRIPTION OF THE DRAWINGS

In the drawings wherein like reference characters indicate like or corresponding elements:

FIG. 3 is a voltage diagram illustrating a first mode of operation of the circuit illustrated in FIG. 2;

FIG. 4 is a similar voltage diagram illustrating a second mode of operation of such circuit;

FIG. 5 is a circuit diagram illustrating the construction of a bit switch which may be employed with the invention; and FIG. 6 illustrates a circuit for supplying control pulses to the amplifier illustrated in FIG. 2.

DETAILED DESCRIPTION OF THE INVENTION

Figure 2:
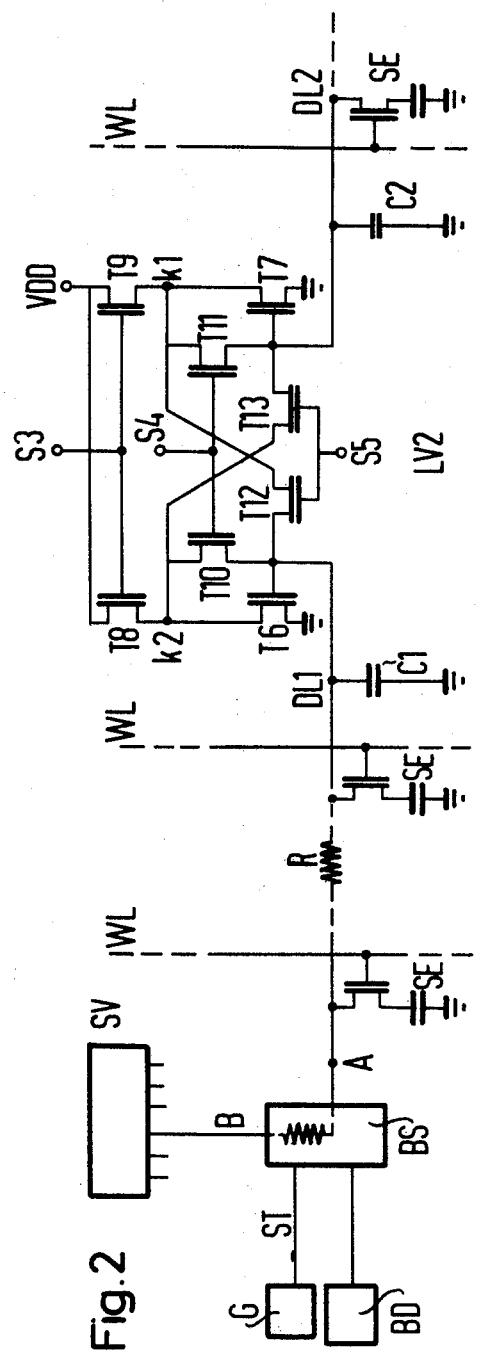
FIG. 2 illustrates an arrangement, in accordance with the invention, for writing-in binary signals.

Referring to the drawings and more particularly to FIG. 2, there is illustrated a read-out amplifier LV2 which also is symmetrically disposed between a first bit line DL1 and a second bit line DL2 with the read-out amplifier LV2 comprising two inverters utilizing transistors T6, T8 and T7, T9 with the transistors T6 and T7 comprising the switching transistors and the transistors T8 and T9 comprising the load transistors. The two feed-back arms of the two inverters are each provided with a respective cut-off transistor T12 or T13. The transistors T10 and T11 illustrated in FIG. 2 are utilized in connection with the read-out operation, and consequently during the write-in of an item of information are always open, and thus are not involved in the present operation. The reference character VDD likewise designates the operating voltage and S3, S4 and S5 are respective timing signals.

It will be noted that, in this circuit, the respective bit lines DL1 and DL2 are connected to the control inputs of the respective switching transistors T6 and T7. In the write-in operation, the item of information to be written-in is conducted from a write-in amplifier SV over a bit switch BS, which in turn is connected to the bit line DL1. The write-in amplifier SV can be of known construction and can be connected to a plurality of bit lines.

The bit switch BS, the construction of which is illustrated in greater detail in FIG. 5, is closed in dependence upon a write-in pulse train ST supplied by a generator G and the output signals of a bit decoder BD with the item of information to be written-in being conducted to the bit line DL. The bit decoder BD and the generator G likewise can be of known construction.

The write-in operation will be explained with reference to the voltage diagram illustrated in FIG. 3, and it will be assumed that an item of information is to be written into one of the storage elements SE connected to the bit line DL1, with the write-in of information into storage elements connected to the other bit lines DL taking place in a corresponding manner.

The word line WL involved is selected by means of a signal wl thereon, and simultaneously therewith the timing signal S3 is applied and the load transistors T8 and T9 are switch on, i.e. conductive. As the timing signal S4 is not applied at this time the transistors T10 and T11 remain open.

At the beginning of the write-in operation the pulse train S5 is switched over from 1 potential to a 0 potential so that the transistors T12 and T13 are open, whereby the bit line DL1 is completely decoupled from the switching transistor T7. The entire current supplied by the bit switch BS thus is available for recharging the bit line DL1.

Referring to FIG. 3, the item of information to be written in is represented on line B, the write-in pulse train is represented by the line ST and the voltage courses on the bit lines DL1 and DL2 are represented on the lines d11 and d12. The solid line curves represent the conditions during the write-in of binary signal 1 while the broken-line curves represent the conditions during the write-in of the binary signal 0.

The circuit thus described may be operated in either of two modes of operation in dependence whether the cut-off transistors T12 and T13 are open or conductive during the write-in of a binary signal. Initially, the mode of operation in which the cut-off transistors T12 and T13 are open during such write-in will be described with the write-in of 0, which requires more time, being explained.

It will be assumed that at the beginning of the write-in phase T the bit line DL1 carries a 1 potential. The bit line DL1 is then rapidly discharged over the bit switch BS, as a result of which the switching transistor T6 is blocked and the node K2 rapidly becomes positive. The transfer phase UE, i.e., the time required to transfer the write-in information into the read-out amplifier, and during which the timing signal S5 must be zero, is completed when the voltage across the node K2 has been safely established. Consequently, the timing signal S5 is not returned to a 1 until the earliest time following a safety interval $t1$. However, due to technological tolerances and voltages, an additional stray range $t2$ arises for the switching on of the transistors T12 and T13 by the timing signal S5. Only at this point, by virtue of the switching on the feed-back paths, is the bit line DL2 likewise charged to the voltage of the node K2 over the transistor T13.

It will be appreciated that by the utilization of a transfer phase UE in which the cut-off transistors T12 and T13 are open, the write-in time can be shortened as the read-out amplifier LV2 can be set very rapidly and as the bit line DL cannot be subjected to a heavy load by any of the switching transistors of the read-out amplifier, the cost outlay and the power loss requirement of the bit switch BS likewise are low.

The write-in time can be further reduced if the transfer phase is omitted which can be achieved by suitable dimensioning of the cut-off transistors T12 and T13. In this case, the transistors T12 and T13 are suitably dimensioned relative to the load transistors T8 and T9 and the switching transistors T6 and T7, with the ratio W/L being correspondingly selected, in which W is the width and L the length of the channel of an MOS transistor. The dimensioning of the cut-off transistors thus is governed by the following rules in which the ratio W/L of the switching transistors T6 and T7 is determined not by the write-in operation but by the read-out operation. Consequently, calculations must be correlated to the ratio W/L of the switching transistors. In order to maintain the recharging time of the bit lines DL the transistors must be so designed that the cut-off transistors T12 and T13 are larger than the load transistors T8 and T9 but smaller than the switching transistors T6 and T7. It will be appreciated that the internal resistance of the transistors is determined correspondingly by the ratio W/L.

In this case, in order to eliminate the transfer phase, the timing signal S5 also remains at 1 during the write-in operation, i.e. the cut-off transistors T12 and T13 remain in the conductive state. However, as the ratio W/L of the cut-off transistors T12, T13 has been so selected that it is small in comparison to the ratio W/L of the cut-off transistors T6, T7, in spite of the presence of the timing signal S5, the cut-off transistors are only relatively slightly conductive, whereas the switching transistor T7 can be highly conductive. The bit line DL1 thus is decoupled from the highly conductive transistor T7. The bit line DL1 thus can be very rapidly recharged by a bit switch BS having a low power loss. However, as the feed-back arm remains connected as a result of the presence of the pulse train S5-1, the change in voltage of the node K2 is immediately transmitted to the bit line DL2 and to the control input of the switching transistor T7. As a result the write-in phase P is shortened.

FIG. 4 illustrates the voltage courses of an amplifier LV2 when operated in the last-mentioned mode. The voltage wl on the word lines WL, the timing signals S3, S4, S5, the item of information B which is to be written in, the write-in pulse train ST and the voltage conditions on the bit lines DL1 and DL2 are likewise illustrated. It will be noted from FIG. 4 that a transfer phase for the pulse train S5 is dispensed with and that the write-in time thus is reduced. It will also be apparent that the voltage on the bit line DL2 immediately changes in correspondence to the voltage on the bit line DL1.

FIG. 5 illustrates a possible construction of the bit switch BS which, in the example illustrated, comprises two transistors T15 and T16. The controlled path of the first transistor T15 is disposed in the line leading from the write-in amplifier to the bit line DL1, with the control input of the transistor T15 being disposed in the controlled path of the transistor T16, which is supplied with the write-in pulse train ST. The control input of the transistor T16, in turn, is connected to the bit decoder BD. Thus if an item of information is to be written-in on the bit line DL1, the transistor T16 is rendered conductive by the bit decoder, and with the write-in pulse train ST being present at the control input of the transistor T15, the latter is brought into a conductive condition. The item of information to be written in is then transmitted to the bit line DL1. The internal resistance of the transistor T15 is designated by the reference character Ri.

Figure 1:
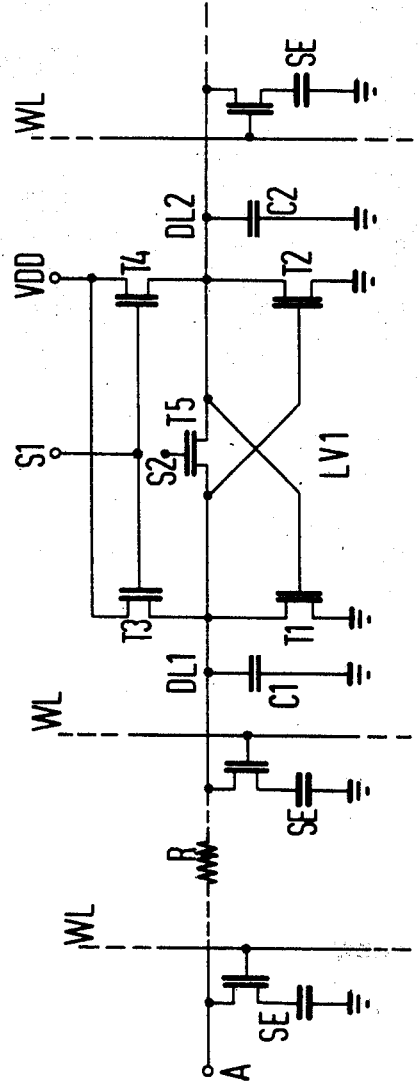
FIG. 1 illustrates a circuit diagram, of known construction, of an arrangement for writing in binary signals.

It will be appreciated that if a bit switch BS constructed as illustrated in FIG. 5 were to be employed in the arrangement such as illustrated in FIG. 1, in the write-in operation the write-in current I through the transistor T15 would have to reverse the read-out amplifier LV1. As the current requirement in this arrangement is relatively high in view of the heavy load represented by the read-out amplifier, it is necessary for the transistor T15 to be of a large construction in order that the ratio W/L is high and thus the internal resistance Ri of the transistor T15 is low. Also a powerful write-in amplifier would be required as it must product a substantial write-in current. Further, a high control voltage would be required at the control input of the transistor T15, which would have to be produced, over the transistor T16, by the bit decoder and the write-in pulse train.

However, when a bit switch of this type is employed in an arrangement such as illustrated in FIG. 2, the write-in current can either be less than zero or equal to zero, thus resulting in a lower cost outlay as well as a reduction in space requirements for the bit switch, a lower power requirement, and a lower control voltage in the bit switch and the write-in amplifier.

It will be appreciated that as a result of this construction, a short write-in time is achieved, the outlay for the bit switch and its power and space requirements are lower, and the series resistance of the bit line is non-critical.

As previously mentioned, the bit decoder BD may be of known construction, for example, such as described in the book "Hans Kaufmann, Data Stores, Oldenbourg Verlag, Munich and Vienna, 1973, page 159."

The signal S5, supplied to the transistors T12 and T13 of FIG. 2 can be suitably derived, for example from the signal ST. FIG. 6 illustrates a circuit for this purpose.

The signal ST is supplied to the transistor T20. The capacitor C20, previously charged over the transistor T21, is discharged over the transistor T20 upon the application of the signal ST thereto so that the capacitor C20 forms the timing circuit of the arrangement. Simultaneously, the transistor T22 becomes conductive and triggers transistor T23 which also becomes conductive. The output capacity of the circuit is thus discharged over the transistor T23. Transistors T24, T25 form an inverter stage which inverts and amplifies the signal applied to T24, while the output stage comprises transistors T26 and T23. The transistor T27 is operative to absolutely block the transistor T23, following expiration of the time period as determined by the capacitor C20 and transistor T20.

In the output condition, the capacitor C20 is charged over transistor T21; transistors T25 and T24 are conductive and transistor T26 is conductive. The signal S5 thus corresponds approximately to VDD. At this time the transistors T22, T20, T27 and T23 are blocked.

If the signal ST (1) appears at the input of transistor T20, the latter becomes conductive causing capacitor C20 to discharge. In addition, transistor T22 becomes conductive and thereby also transistor T23. The signal S5 thus approaches zero volt. Following discharge of capacitor C20, transistors T24 and T22 return to a blocking condition resulting in transistors T27 and T26 becoming fully conductive. Transistor T 23 blocks and signal S5 again returns to a 1. Details of this signal generator form no part of the present invention, being present only for explanatory purposes.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. In an arrangement for writing binary signals into selected storage elements of an MOS store having word and bit lines, utilizing a read-out amplifier which is constructed as a pulsed flip-flop, having two inverters with feed-back, each of which comprises a switching transistor and a load transistor, with each feed-back arm of the flip-flop having a cut-off transistor disposed therein, the combination of each bit line of the storage elements being connected to the control gate input of a respective switching transistor of the read-out amplifier, a bit switch connected to one bit line, adapted to be connected to a bit decoder and a line supplying a write-in pulse train, for control of the bit switch thereby, operative to thus transfer the write-in information to only the bit line cooperable therewith.

2. An arrangement according to claim 1, wherein the ratio W/L, in which W=width and L=length of the MOS transistor channel, of the cut-off transistors is lower than the corresponding ratio of the switching transistors whereby, in conductive state, the internal resistance of the cut-off transistors is high in comparison to that of the switching transistors.

3. An arrangement according to claim 2, wherein the ratio W/L of the cut-off transistors is greater than the ratio W/L of the load transistors.

4. A method of operating an arrangement for writing binary signals into selected storage elements of an MOS store having word and bit lines, utilizing a read-out amplifier which is constructed as a pulsed flip-flop, having two inverters with feed-back, each of which comprises a switching transistor and a load transistor, with each feed-back arm of the flip-flop having a cut-off transistor disposed therein, and with each bit line of the storage elements being connected to the control gate input of a respectibve switching transistor of the associated read-out amplifier, and with a bit switch controlled by a bit decoder and a write-in pulse train connected to one bit line, comprising the steps of opening the cut-off transistors of the read-out amplifier associated with the selected bit line to decouple the two switching transistors thereof, applying a signal to the selected work line and switching the load transistors conductive, recharging the adjacent bit line from the cooperable bit switch in accordance with the item of information which is to be written in, and rendering the cut-off transistors conductive only after the associated switching transistor has been set in accordance with such item of information.

5. A method of operating an arrangement for writing binary signals into selected storage elements of an MOS store having work and bit lines, utilizing a read-out amplifier which is constructed as a pulsed flip-flop, having two inverters with feed-back, each of which comprises a switching transistor and a load transistor, with each feed-back arm of the flip-flop having a cut-off transistor disposed therein and with each bit line of the storage elements being connected to the control gate input of a respective switching transistor of the associated read-out amplifier, and with a bit switch controlled by a bit decoder and a write-in pulse train, connected to one bit line, and the cut-off transistors having a ratio W/L, in which W=width and L=length of the MOS transistor channel, is lower than the corresponding ratio of the switching transistors whereby, in conductive state the internal resistance of the cut-off transistors is high in comparison to that of the switching transistors, comprising the steps of maintaining the cut-off transistors of the associated read-out amplifier conductive during the writing-in operation, applying a signal to the selected work line and switching the load transistors conductive, and recharging the adjacent bit line from the cooperable bit switch in accordance with the item of information which is to be written in.

* * * * *